Figure 4:
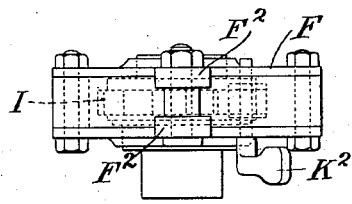

J. E. ANGER.
SLACK ADJUSTER.
APPLICATION FILED FEB. 25, 1913.
1,151,328.
Patented Aug. 24, 1915.
2 SHEETS—SHEET 1.
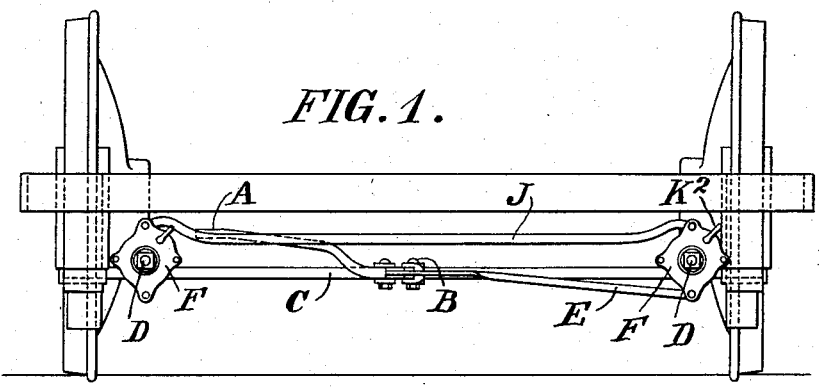
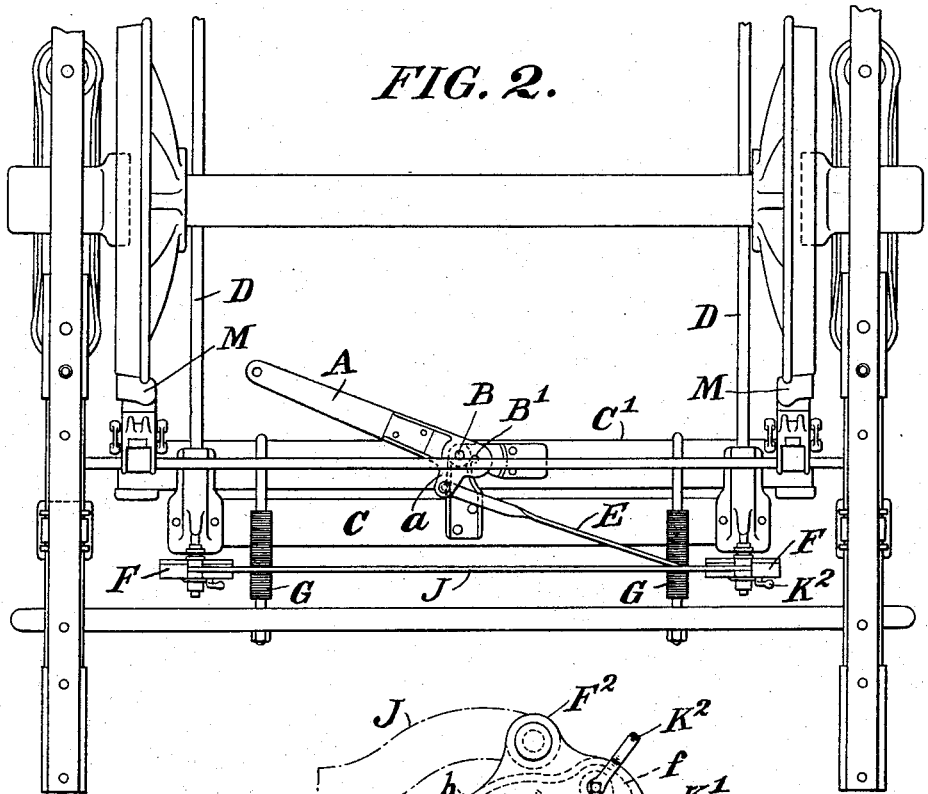
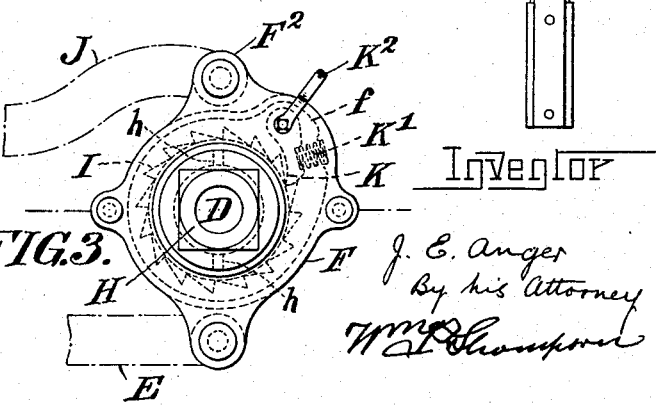

J. E. ANGER.
SLACK ADJUSTER.
APPLICATION FILED FEB. 25, 1913.

1,151,328.

Patented Aug. 24, 1915.
2 SHEETS—SHEET 2.

Witnesses

Inventor
J. E. Anger
By his attorney

UNITED STATES PATENT OFFICE.

JOHN EDWARD ANGER, OF PRESTON, ENGLAND.

SLACK-ADJUSTER.

1,151,328.　　　　Specification of Letters Patent.　　Patented Aug. 24, 1915.

Application filed February 25, 1913. Serial No. 750,584.

*To all whom it may concern:*

Be it known that I, JOHN EDWARD ANGER, a citizen of the United States of America, residing at Preston, in the county of Lancaster, in the Kingdom of England, have invented certain new and useful Improvements in Slack-Adjusters, of which the following is a specification.

This invention relates to apparatus for automatically taking up the slack in the brakes of tram-cars and the like, such apparatus being of the type in which there is a nut on the screw at the end or ends of the brake rods, and a ratchet device so arranged and connected with the brake lever, that whenever the latter, owing to wear of the brake blocks, is oscillated beyond a given distance, said ratchet device shall move forward a tooth, and automatically adjust or screw up the brake blocks.

Now the present invention has for its object certain improvements on this type of apparatus, more especially in the apparatus in respect of which the present applicant obtained Letters Patent No. 671,787, April 9, 1901.

These present improvements consist, first, in inclosing the ratchet gear in water, dust and mud proof casings so as to insure their free action under all conditions of weather, and in coupling the casings (which carry the pawls) together as one integer by a connecting rod so as to insure the slack being equally taken up at both sides of the vehicle. This is a great advantage, because if a chain be used as in the said prior patent, the slack is not always taken up equally at each side of the vehicle owing to the slack in the chain; second by the nut (which is screwed onto the end of the brake rod, and on which the ratchet wheel within the casing is mounted so as to work solidly with the nut as regards rotary motion) being provided with a peripheral shoulder against which the said ratchet wheel abuts; third, by the nut, which in the prior patent was wholly contained, or substantially so, within the casing, being provided with a short squared extension, which projects through the axial center of the said casing just far enough to be turned back by hand from the outside; fourth, by the said ratchet casing being built up of a side plate with a lateral flange projecting therefrom, and a cover plate bolted to the opposite side plate so that it can be opened to insert or remove the ratchet wheel; fifth, by locating the embayment for the reception of the pawl in the said dust proof ratchet casing, in such a position as to clear the lugs to which the connecting rod is coupled; sixth, by so arranging the pawl that it can be turned from the outside of the ratchet casing without leaving any opening through which dust and dirt can penetrate into the casing.

Figure 5:
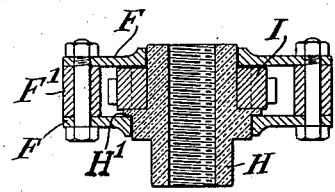
Figure 6:
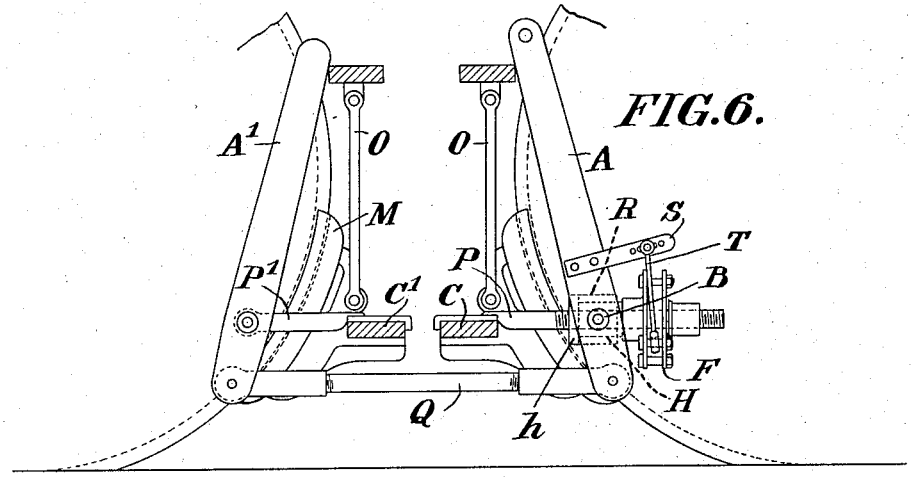
Figure 7:
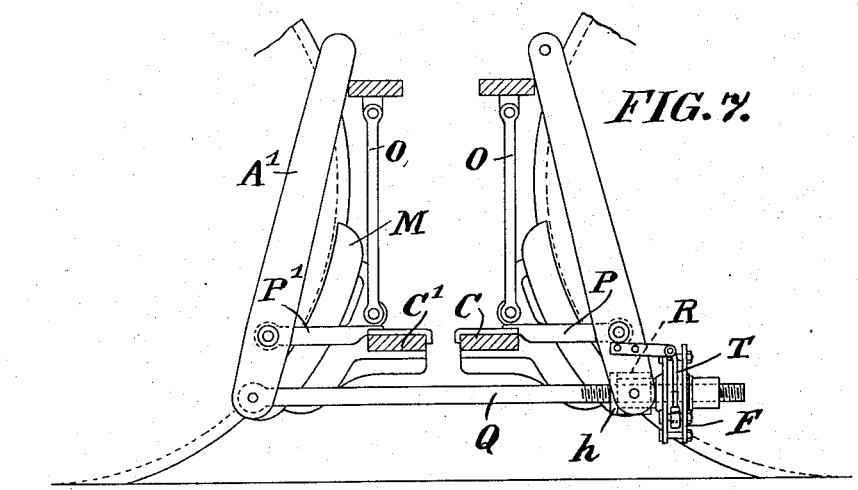

In the accompanying drawings:—Figure 1 is an end view showing my automatic slack adjuster applied to the brake rods on a single truck car; Fig. 2, a plan view; Fig. 3 is a face view of the ratchet casing which revolves freely on the brake rod nut, and which carries a pawl and has the operating rods coupled to it; Fig. 4, a plan view; and Fig. 5, a cross section thereof. Fig. 6 is a side elevation of the brake mechanism of a four wheel bogie truck; Fig. 7 is a similar view showing a slight modification.

The ordinary brake lever A for putting on the brake, is fulcrumed by means of a pivot pin B to the brake beam C to which the two ordinary brake rods D are attached, these rods running to the other end of the car for the purpose of operating the brake blocks at that end. The said brake lever is also pivoted at B′ to the other brake beam C′ that operates the brake blocks M at the near end. This lever has a crank arm $a$ coupled by a connecting rod E to a ratchet wheel casing F hereinafter described. The brake shoes are held normally clear of the wheels by springs G, such springs for example acting on the brake beam C′, and also forcing the brake lever A back to its former position, when the temporary application of the brake to the wheels, is to be discontinued.

Upon the screwed end of each brake rod D is a nut H provided at about midlength with an external peripheral collar. At one side of this collar the nut has a squared exterior, while at the other (or inner) side of this collar, a pawl driven ratchet wheel I is mounted on each nut so as to rest against the collar, the said ratchet wheel being keyed onto the nut so as to work solidly with it as regards rotary motion around the axis of the brake rod. Both the nut and ratchet wheel are separate and distinct pieces, the one having key members $h$ entering freely grooves in the other, so that the ratchet wheel can be slid off the nut easily and be replaced. Journaled freely on this nut H at two places, namely at the inner end and on the collar, is a ratchet casing F, this being hollow inside so as to contain the ratchet wheel therewithin, the outside (or squared exterior) end of the nut H and the screwed end of the rod D projecting through the casing to the outside. There are a pair of these ratchet casings F, one journaled on the nut at the screwed end of one brake rod, and the other journaled on the nut at the screwed end of the other brake rod, but the two casings are coupled together by a connecting rod J so that both shall act simultaneously, that is to say, the operation of the brake lever A will oscillate one ratchet casing F, and through the connecting rod J, the other casing also.

The inside of the ratchet casing F is substantially circular, except at one part where it is provided with an embayment $f$ in which is mounted a pawl K fixed on a spindle journaled in the casing. This pawl or click is held in engagement with the ratchet teeth I by means of a spring K', while outside the casing is a thumb lever $K^2$ to disengage the pawl from the ratchet teeth when required. Whenever the brake is applied the lower operating rod E rotates the bottom of the casing to the right. When the brake is released, the said rod moves it to the left. The upper rod J acts simply as a tie between the two casings, so that both operate together.

The ratchet casing F is built up of a side plate provided with a lateral annular flange or collar F' to surround the ratchet wheel, and a cover plate. The side plate member is mounted on the nut H at its inner end at one side of the ratchet wheel, and the cover plate is mounted on the peripheral collar of the nut H at the other side of the ratchet wheel, while at one end, the collar has a peripheral feather H' which interposes itself between the ratchet wheel and the cover plate so as to form a shoulder for the cover plate to abut against and keep the said cover plate spaced away from the ratchet wheel. By means of lugs on the exterior of the casing, and bolts, the cover plate is bolted to the side plate so as to insure an effective joint or contact against the flange or collar. An even more important function of the feather H' is to prevent the nut H being accidentally or mischievously unscrewed out of the casing from off the rod D. The ratchet wheel being keyed freely on the nut there would in the absence of the feather be nothing to prevent the nut being unscrewed out of the casing from off the rod D. The peripheral feather H' absolutely prevents this. This flange or collar F which surrounds the ratchet wheel I, contains the embayment for the pawl K, and thus when these two parts are closed together, the collar on one part abuts against the other part, and then by passing bolts through the lugs $F^2$, the two parts are secured together with the ratchet wheel inside, and the connecting rod ends coupled onto the bolts between the lugs $F^2$. Thus the chamber inside the casing is absolutely dirt and water proof, and nothing can get in to interfere with the free action of the ratchet wheel and pawl. The embayment for the reception of the pawl is located at one side of the exterior lug instead of vertically above the ratchet wheel, and the pawl is held in engagement with the ratchet wheel by a spring.

The spindle of the pawl is journaled in a hole in the cover plate, and projects therethrough to the outside, but in such manner as to leave no opening through which dust and dirt can penetrate into the ratchet casing. At the end of this spindle a thumb lever $K^2$ is provided, by turning which the pawl can be disengaged from the ratchet teeth. The square part of the nut H projects through the ratchet casing just far enough to enable the nut to be turned by hand from the outside, when the pawl which can also be operated from the outside, is lifted. This facilitates new brake blocks being placed in position when it is required to replace the worn ones.

The mode of action is as follows: In order to apply the brake, the brake lever A is pulled outward, and this causes the connecting rod E to turn the ratchet casing F to which it is coupled, and through the coupling rod J, the other ratchet casing F, and the pawls K with them. At the outset with new brake blocks or shoes, the brake lever A will only have to travel a small distance to apply the brake blocks M to the wheels, so that at first each ratchet casing will oscillate less than the length of one ratchet tooth, and the ratchet casings will oscillate back without operating the ratchet wheels, when the brake lever is released, because the normal movement imparted to the pawl by the brake lever is less than the distance between two teeth of the ratchet, so that ordinarily the pawl moves back and forth on the surface of one tooth without any effect. Should however the brake lever from wear of the blocks, travel farther than a given distance, the motion of the casings F which carry the pawls K, will cause the pawls to travel more than the length of one tooth of the ratchet wheels I, so that each pawl will fall into the next interdental space of its ratchet wheel rising as the casing turns in one direction, but insuring that the backward motion of the casing will turn the ratchet wheel I and nut H. Upon releasing the brake lever A, the springs in forcing the lever back to its former position, will likewise cause the connecting rods E J to oscillate the casings F back, and with them the pawls, which will turn the ratchet wheels I one tooth, and thus the nuts H will tighten up the brake rods D to the amount of wear of the brake blocks M that has taken place. This therefore takes up the slack and adjusts the brake blocks at both ends of the vehicle, and whenever the slack increases so as to enable the brake lever to move the casing, a greater angular distance than one tooth of the ratchet wheel, the slack is automatically taken up, and safety and effective braking results are insured. By this means the brake is kept in proper adjustment, so that the nuts can never loosen, and are always moved in one direction.

The brake adjuster does not come into action with every movement of the brake lever, and it does not matter how many times the motorman applies his brake, the adjuster only comes into action when the brake lever on the truck has been allowed to travel past a certain point, which is caused by any wear in the shoe, and then immediately upon the brake being released, the ratchet casings on each brake rod operate together and automatically cause their pawls to engage the next tooth, thus winding up the ratchet wheels in one direction. Hence the shoes are kept the proper and required distance from the wheels until the shoes are worn out.

To enable new brake blocks M to be applied, the thumb levers $K^2$ are turned so as to disengage the pawls from the ratchet wheels. The nuts H can then be turned back by hand, to bring the blocks back far enough to enable them to be removed, and to be replaced by new ones. When the pawl is lifted away from the teeth of the ratchet, the device is inoperative, and the arrangement becomes exactly similar in operation to the ordinary brake rigging.

The ratchet wheel I is so mounted on the nut H that it can be removed therefrom when required, and the shoulder on the nut enables the ratchet wheel to lock against it. Both the nut and ratchet wheel are separate and distinct pieces, and the nut can therefore be replaced easily, without having to replace the whole adjuster.

Figs. 1 and 2 of the drawing show the adjuster applied to the single truck of a single truck car where the brake blocks are on the outside or ends of the truck, but where the brake blocks are hung on the inside of the wheels, that is between the wheels as on a bogie truck car, the adjuster F is so applied as to replace the usual turn-buckle or adjusting nut on the connecting or push rods that connect the short arms of the brake levers together. This is shown in Fig. 6, which is a side elevation of the brake mechanism of a four wheel bogie truck of an electric tramcar with my invention applied thereto. In this figure, C' are the brake beams which operate the brake blocks M and these cross beams and brake blocks are suspended by links O from the framework of the truck. To one of these beams is attached the rod P, and to the other beam is attached the rod P'. A is the brake lever trunnioned on pin B, and A' the other lever which is coupled to the end of the rod P'. The short arms of these levers are connected by the connecting or push rod Q. The rod P is threaded to receive the nut H of the adjuster F, the said nut being extended somewhat so as to pass between the forked end of the brake lever A, and is provided with a collar $h$ at its extreme end. Journaled freely on this nut, is the collar R which carries the trunnion pin B. To the brake lever A, the arm S is secured, which is coupled by the connecting rod T to the adjuster F, the arm S having several holes in it, to enable the stroke of the adjuster to be varied. When therefore the brake lever A is pulled outward, the trunnion collar R abutting against the adjuster F, forces its brake block M against its wheel, while the other brake block is forced against its wheel by the connecting rod Q, the upper end of the brake lever A' remaining stationary. At the outset with new brake blocks, the brake lever A will only have to travel a small distance to apply the blocks M to the wheels, so that at first the adjuster F will oscillate less than one ratchet tooth, and the adjuster will oscillate back without operating the ratchet wheels, when the brake lever A is released. As however the blocks wear, the brake lever causes the pawl to travel more than the length of one tooth of the ratchet wheel, thus insuring that the nut H will tighten up the rod P by the backward motion of the adjuster, when the lever A is released to the amount of wear that has taken place. This therefore takes up the slack and adjusts the brake blocks of both wheels. Clearly the adjuster F could be applied equally well directly to the rod Q. This is shown in Fig. 7 in which the rod Q is threaded to receive the nut of the adjuster instead of the rod P, and the short arm of the brake lever A beyond where it is pivoted to the rod P, is trunnioned on this nut.

I declare that what I claim is:—

1. In apparatus of the type referred to for automatically taking up the slack in brake apparatus, the combination with brake rods, of nuts on both brake rods, of ratchet wheels and pawls in connection with the nuts, water, dust and mud proof casings journaled on the nuts within which the ratchet wheels and pawls are inclosed, exterior lugs on the casings and a connecting rod for coupling said lugs together, so as to insure the slack being taken up equally at each side of the vehicle.

2. In a slack adjuster, the combination with brake rods, of nuts screwed thereon, a peripheral collar at about mid-length of each nut, a squared exterior on each nut at one side of this collar, a pawl driven ratchet wheel mounted on each nut (so as to work solidly with it) at the other side of this collar, a ratchet casing journaled freely on this collar and on the inner end of the nut, so as to leave the squared exterior beyond the collar and the screwed end of the brake rod projecting through the ratchet casing to the outside to enable the nut to be turned by hand from the outside when the pawl is lifted, exterior lugs on the casings, and a connecting rod for coupling the said lugs together so as to insure the slack being taken up equally at each side of the vehicle.

3. In a slack adjuster, the combination with brake rods, of nuts screwed thereon, a peripheral collar at about midlength of each nut, a squared exterior on each nut at one side of this collar, a pawl driven ratchet wheel mounted on each nut (so as to work solidly with it) at the other side of this collar, a ratchet casing journaled freely on this collar and on the inner end of the nut, so as to leave the squared extension beyond the collar and the screwed end of the brake rod projecting through the casing to the outside, exterior lugs on the casing, a connecting rod for coupling said lugs together and a peripheral feather at the inner edge of the collar to form a shoulder against which the part of the ratchet casing that is mounted on the collar abuts to prevent the nut being unscrewed out of the casing.

4. In a brake adjuster, the combination with brake rods, of nuts screwed thereon, a peripheral collar at about midlength of each nut, a squared exterior on each nut at one side of the said collar, a pawl driven ratchet wheel keyed to the said nut at the other side of the said collar, a ratchet casing built up of a side plate provided with a lateral annular flange to surround the ratchet wheel, and a cover plate, which plates are journaled on the nut, lugs on the outside of the side plate, and cover plate, bolts for bolting the lugs together so as to insure an effective joint between the cover plate and the flange on the side plate and a connecting rod for connecting said lugs together.

5. In a brake adjuster, the combination with brake rods, of nuts screwed thereon, a peripheral collar at about midlength of each nut, a squared exterior on each nut at one side of the collar, a pawl driven ratchet wheel mounted on each nut so as to work solidly with it at the other side of this collar, a ratchet casing built up of a side plate provided with a lateral annular flange to surround the ratchet wheel, and a cover plate, which plates are journaled on the nut, lugs on the outside of the side plate and cover plate, a connecting rod for coupling the said lugs together, an embayment for the reception of a pawl on the inside of the lateral annular flange, said embayment being located at one side of the exterior lugs so as to clear the same, and a spring K′ for pressing the pawl into contact with the ratchet wheel.

6. In a brake adjuster, the combination with brake rods, of nuts screwed thereon, a peripheral collar at about midlength of each nut, a squared exterior on each nut at one side of this collar, a pawl driven ratchet wheel mounted on each nut so as to work solidly with it at the other side of this collar, a ratchet casing built up of a side plate provided with a lateral annular flange to surround the ratchet wheel and cover plate, which plates are journaled on the nut, lugs on the outside of the side plate and cover plate, a connecting rod for coupling the said lugs together, an embayment for the reception of a pawl on the inside of the lateral annular flange, a spindle by which the pawl is journaled in the cover plate, the said spindle projecting through the cover plate to the outside where it is provided with a handle for turning the pawl in such manner as to leave no opening through which dust and dirt can penetrate into the casing.

In witness whereof, I have hereunto signed my name this 15 day of February 1913, in the presence of two subscribing witnesses.

JOHN EDWARD ANGER.

Witnesses:
 GEORGE HERMAN ANGER,
 THOMAS S. SHILLINGTON.